J. H. MISKIMEN.
AUTOMOBILE RIM.
APPLICATION FILED JUNE 19, 1918.
1,303,357.
Patented May 13, 1919.
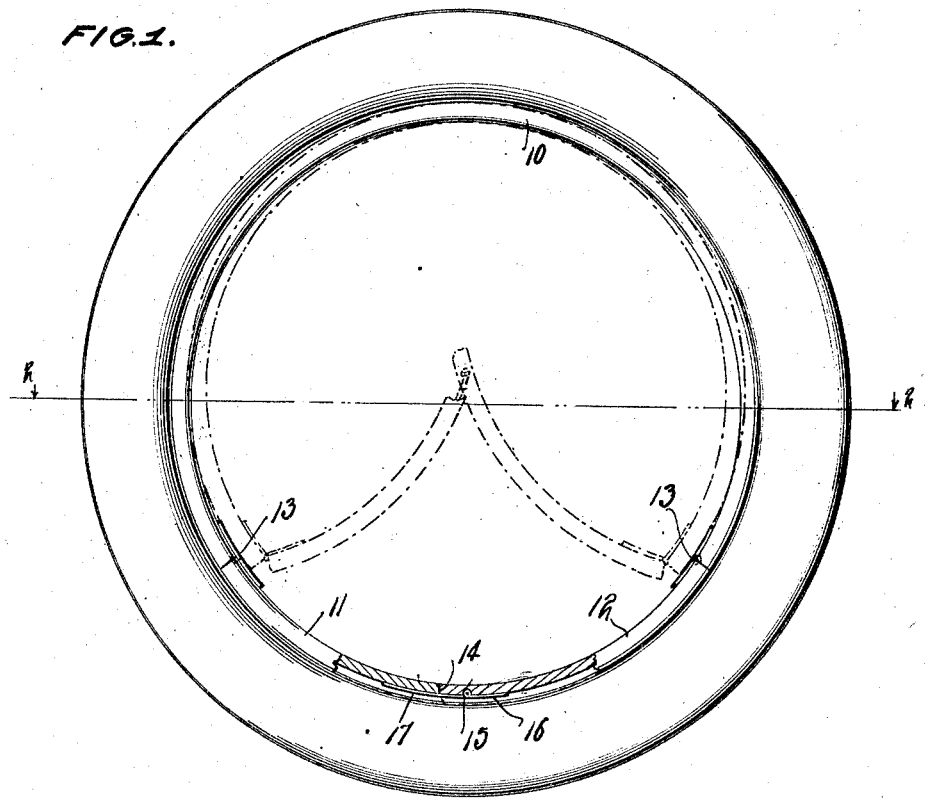
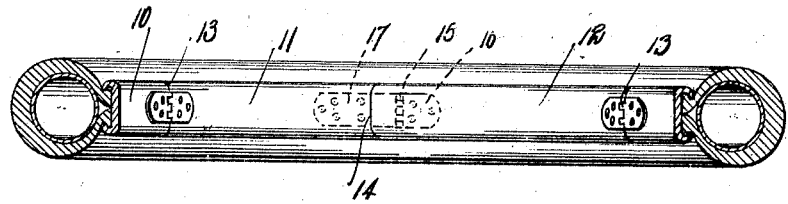
WITNESSES
INVENTOR
Judson H. Miskimen
BY
ATTORNEY

UNITED STATES PATENT OFFICE.

JUDSON H. MISKIMEN, OF GLENDIVE, MONTANA.

AUTOMOBILE-RIM.

1,303,357.  Specification of Letters Patent.  Patented May 13, 1919.

Application filed June 19, 1918. Serial No. 240,794.

*To all whom it may concern:*

Be it known that I, JUDSON H. MISKIMEN, a citizen of the United States, residing at Glendive, in the county of Dawson and State of Montana, have invented certain new and useful Improvements in Automobile-Rims, of which the following is a specification.

This invention has relation to demountable rims for pneumatic tires, and has for an object to provide a demountable rim of a new and novel character adapted to permit the instant removal of the rim from the tire in an easy and efficacious manner.

Another object of the invention is to provide a demountable rim of the character above described which is formed in a plurality of hingedly connected sections, whereby the rim may be collapsed while in position within the tire casing thereby insuring the quick detachment of the rim from the tire.

In addition to the foregoing my invention comprehends improvements in the details of construction and arrangement of the parts to be hereinafter more fully described and particularly set forth in the appended claims.

In the accompanying drawings in which similar and corresponding parts are designated by the same characters of reference throughout the several views in which they appear:—

Figure 1, is a view in side elevation of a tire applied to my improved demountable rim, illustrating the collapsed position of the parts of the rim in dotted lines, and Fig. 2, is a section taken on the line 2—2 of the preceding figure.

With reference to the drawings, 10, 11, and 12, indicate the three sections of my demountable rim, shown in the present instance as adapted to receive a pneumatic tire casing of the clencher type, although it may be apparent that the rim may be utilized in connection with tire casings of other types. The section 10 is equal in length to approximately two-thirds the circumference of the rim, the sections 11 and 12 occupying jointly the remaining one-third. The terminals of section 10 are connected to the remote ends of sections 11 and 12 through the medium of hinges 13 which are applied to the inner surface of the rim. The adjacent ends of the sections 11 and 12 are beveled as at 14 whereby the line of the joint between the sections when they are in circumferential alinement is at an angle to the lineal side it being noted however, that one section is slightly shorter than the other, the shorter section in the present instance being the one indicated at 11. The adjacent ends of said sections 11 and 12 are connected together by means of a hinge 15 which is applied to the exterior surface of the rim within the clencher edges thereof and said hinge comprises a short leaf 16 secured to the section 12, and a long leaf 17 which extends across the joint between the sections and is secured to the section 11. The pintle of the hinge 15 is located at a point exactly midway of the hinges 13.

In use, when it is desired to disengage the rim from the tire it is but necessary to permit the tire to strike upon an object at a point adjacent the pintle of the hinge 15 and the blow will result in the disengagement of the sections 11 and 12 from the clencher rim of the tire permitting the sections to be moved relatively and toward the center of the wheel to assume a position shown in dotted lines in Fig. 1. If the section 10 is resilient and the terminals thereof are swung toward each other the section 10 may be more readily disengaged from the tire. Thus it will be seen that I have provided a demountable rim of a new and novel type which is capable of instant removal or disengagement from a tire casing, the reapplication of the demountable rim to the tire casing being as readily and quickly accomplished.

While I have illustrated and described my invention with some degree of particularity, I realize that in practice various alterations thereover may be made, and I therefore desire to reserve the right and privilege of changing the form of the details of construction, or otherwise altering the arrangement of the correlative parts without departing from the spirit of the invention or the scope of the appended claims.

Having thus described my invention what I claim as new and desire to secure by Letters Patent is:—

1. A demountable rim including a section equal in length to approximately two-thirds the circumference of the rim, a pair of sections equal in length jointly-to the remaining third of the circumference, one of said mentioned sections being slightly shorter than the other, hinges applied to the internal surface of the sections to connect the terminals of the first mentioned section with the remote ends of the second mentioned section, and a hinge member applied to the external surface of the second mentioned sections for hingedly connecting their adjacent ends.

2. A demountable rim including one section equal in length to approximately two-thirds the circumference of the rim, a pair of sections jointly equal in length to the remaining one-third of the circumference, one of said sections being slightly shorter than the other and the meeting ends of said sections beveled, hinged members secured to the internal surface of the rim to connect the terminals of the first mentioned section with the remote ends of the second mentioned sections, and a hinge member secured externally to the rim to connect the adjacent ends of the second mentioned sections, said hinge comprising a short plate secured to the longer of the second mentioned sections, and a long plate to extend across the joint between the second mentioned sections, and secured to the shorter section.

In testimony whereof I affix my signature in presence of two witnesses.

JUDSON H. MISKIMEN.

Witnesses:
JENS RIVENES,
VALBORG RIVENES.